US010885763B2

(12) United States Patent
Gerbus et al.

(10) Patent No.: US 10,885,763 B2
(45) Date of Patent: Jan. 5, 2021

(54) SENSING TECHNOLOGIES IN ALARM DEVICES

(71) Applicant: Intel Corporation, Santa Clara, CA (US)

(72) Inventors: Dan H. Gerbus, Aloha, OR (US); Ralph V. Miele, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 15/089,272

(22) Filed: Apr. 1, 2016

(65) Prior Publication Data

US 2017/0287309 A1 Oct. 5, 2017

(51) Int. Cl.

*G08B 17/10* (2006.01)
*H04N 7/18* (2006.01)
*G08B 21/18* (2006.01)
*G08B 27/00* (2006.01)

(52) U.S. Cl.

CPC ......... *G08B 21/182* (2013.01); *G08B 27/001* (2013.01)

(58) Field of Classification Search

None
See application file for complete search history.

(56) References Cited

U.S. PATENT DOCUMENTS 4,171,486 A * 10/1979 Dobrzanski .......... G08B 17/113 250/381
6,459,370 B1 * 10/2002 Barrieau ................ G08B 29/06 324/522
8,502,870 B2 8/2013 Bentkovski
2007/0256105 A1 * 11/2007 Tabe .................... G08B 25/085 725/78
2008/0291036 A1 * 11/2008 Richmond ........... G08B 19/005 340/628
2013/0201316 A1 8/2013 Binder et al.
2014/0159856 A1 6/2014 Meyer et al.
2014/0340216 A1 11/2014 Puskarich
2015/0161869 A1 6/2015 Hohl et al.

(Continued)

FOREIGN PATENT DOCUMENTS

CN 104599428 A 5/2015
KR 100495577 B1 6/2005
KR 20150100240 A 9/2015

(Continued)

OTHER PUBLICATIONS

"International Application Serial No. PCT/US2017/018924, International Search Report dated May 25, 2017", 3 pgs.

(Continued)

*Primary Examiner* — John F Mortell
(74) *Attorney, Agent, or Firm* — Schwegman Lundberg & Woessner, P.A.

(57) ABSTRACT

A detection system having a threshold sensor for detecting indices of an emergency event in a space and a persistent sensor for continually gathering information within a space. The detection system can monitor the space to determine if an emergency event is occurring and continue to collect information regarding the space. The collected information can be transmitted to rescue workers to provide real time or updated information on people present in the space and their condition or other information.

25 Claims, 6 Drawing Sheets

(56) References Cited

U.S. PATENT DOCUMENTS

| | | | | |
|---|---|---|---|---|
| 2015/0206419 | A1 | 7/2015 | Johnson et al. | |
| 2015/0304613 | A1* | 10/2015 | Child ............... | G08B 13/19697 348/143 |

FOREIGN PATENT DOCUMENTS

| | | | |
|---|---|---|---|
| KR | 101563655 | B1 | 10/2015 |
| WO | 2017172123 | | 10/2017 |

OTHER PUBLICATIONS

"International Application Serial No. PCT/US2017/018924, Written Opinion dated May 25, 2017", 9 pgs.

"Nest Support: Nest Protect 2nd generation system requirements and technical specifications", Nest, [Online]. Retrieved from the Internet: <URL: Nest Protect 2nd generation system requirements and technical specifications>, Jun. 26, 2015, 9 pgs.

"SigniFire: Flame, Smoke and Intrusion Video Detection Technology", Fike: Intelligent Fire Alarm Detection, (2014), 6 pgs.

"International Application Serial No. PCT US2017 018924, International Preliminary Report on Patentability dated Oct. 11, 2018", 11 pgs.

* cited by examiner

SENSING TECHNOLOGIES IN ALARM DEVICES

TECHNICAL FIELD

This document pertains generally, but not by way of limitation, to sensing and associated communication technologies for alarm devices.

BACKGROUND

Emergency and rescue workers arriving at an emergency event often seek out information regarding who was onsite at the time of the emergency and their current locations and conditions. The information can be used to locate persons who may be trapped and require assistance in evacuating the site. Rescue workers can also use the information to determine the most efficient plan to rescue trapped persons or prioritize persons who are closest to the source of the emergency and at the greatest risk. However, the obtained information must be accurate and up-to-date as delayed or incorrect information can delay rescue of trapped incapacitated persons, which can result in more severe injuries or casualties. Similarly, rescue workers can be injured or killed attempting to rescue persons who have already escaped or died.

Due to the often chaotic nature of emergency events, obtaining information about onsite persons in a timely manner and before the information becomes outdated can be difficult. A related difficulty is communicating any obtained information to the appropriate rescue workers in a timely manner. With certain commercial and industrial sites, information on persons who work at the site is filed with local authorities. However, that information must be retrieved and communicated from the dispatcher to onsite rescue workers in a timely manner. Moreover, as this information is filed in anticipation of an emergency event rather than based on real time information, the information is often limited and outdated. At large emergency events, the communication issues are often exaggerated as rescue workers from different agencies or regions are often pooled.

The inability to quickly obtain and distribute accurate and timely information in emergency situations can hamper the ability of rescue workers to quickly evacuate persons from the site of an emergency event.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
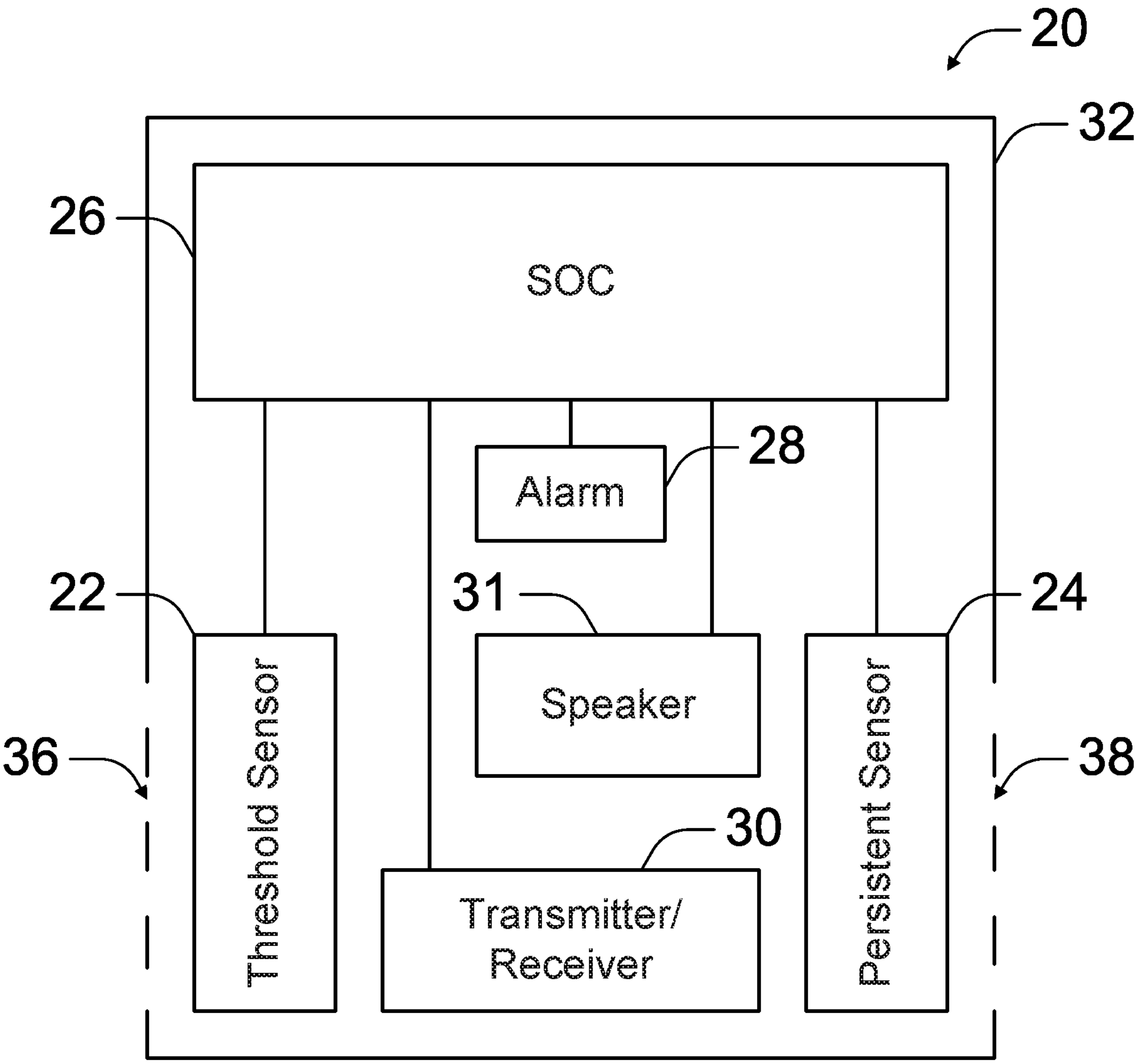
FIG. 1 is a schematic diagram of a detection system according to an example of the present disclosure.

The present inventors have recognized among other things, that a problem to be solved can include providing accurate and timely information to rescue workers during an emergency situation. In an example, the present subject matter can provide a solution to this problem, such as by providing a detection system having a threshold sensor for detecting indices of an emergency event in a space and a persistent sensor for continually gathering information within a space. The detection system can monitor the space to determine if an emergency event is occurring and continue to collect information regarding the space. The collected information can be transmitted to rescue workers to provide real time or updated information on people present in the space and their condition or other information. The detection system can be positioned on a wall or a ceiling to optimize measurement of the indicia of an emergency event. The positioning of the detection system for measurement of indicia of emergency events also optimally positions the persistent sensors for gathering space information.

In an example, the threshold sensor can detect when an indicia of an emergency event, such as smoke or heat, exceeds a predetermined threshold and transmits a warning signal to an integrated system on a chip ("SOC") that an emergency event could be occurring. The SOC can interpret the warning signal to determine if an emergency event is occurring. The SOC can be operably connected to an integrated alarm that can be triggered if the SOC determines that an emergency event is occurring.

In an example, the persistent sensor can continuously or regularly monitor the space for information, such as the presence of persons within the space and their present condition. The persistent sensor can be configured to continuously monitor the space prior to and following detection of an emergency event by the threshold sensor. The space information can be continuously transmitted to rescue workers to provide the space information in real time to rescue workers. The space information can also be transmitted as updates to rescue workers at regular intervals or the persistent sensor detects changes within the space.

In an example, the detection system can wired to a central control system for a building or include a wireless transmitter for wirelessly connecting the detection system to the central control system. The central control system can include a wireless receiver to wirelessly connect the detection system to the central control system in addition to or in place of the wired connection. In this configuration, the SOC can transmit the warning signal to the central control system, which can determine if an emergency event is occurring based on warning signals from other detection system. The SOC can receive an alarm signal from the central control system to initiate the integrated alarm if the central control system determines that an emergency event is occurring. Similarly, the SOC can receive space information from the persistent sensor and communicate the space information to the central control system or a remote receiver through the wired connection or the wireless transmitter. Rescue workers can access the information from the SOC at a control panel for the central control system or via a remote receiver. The central control system can be configured to communicate the information to rescue workers via wired or wireless communication systems.

The SOC can coordinate information from the threshold sensor and the persistent sensor to determine if certain high risk situations such as a person in the space with indicia of the emergency event. The SOC can communicate a detected high risk situation to rescue workers via the wireless transmitter or the central control system.

This overview is intended to provide an overview of subject matter of the present patent application. It is not intended to provide an exclusive or exhaustive explanation of the present subject matter. The detailed description is included to provide further information about the present patent application.

As depicted in FIG. 1, a detection system 20, according to an example, can include at least one threshold sensor 22, at least one persistent sensor 24 and an SOC 26. Each threshold sensor 22 can be configured to determine if an emergency event is occurring within a space in which the detection system 20 is positioned. Similarly, each persistent sensor 24 can be configured to gather information regarding the space that could benefit rescue workers.

In an example, each threshold sensor 22 can monitor a space for indicia of an emergency event that exceeds a predetermined threshold. The indicia can include, but are not limited to temperature, humidity, smoke, open flames, harmful gases, insufficient ventilation, radiation, explosions, gun shots, and combinations thereof. In an example, the detection system 20 can include a plurality of threshold sensors 22 each configured to measure a different indicia such that the detection system 20 can monitor the space for different emergency events. The threshold sensor 22 can be comprise an optical sensor, a 3D camera, an infrared sensor, a temperature sensor, a humidity sensor, a motion sensor, a microphone, or combinations thereof for monitoring for one or more indicia. The SOC 26 can receive a warning signal from the threshold sensor 22 when the threshold sensor 22 determines that the indicia have exceeded a predetermined threshold.

The SOC 26 can evaluate the warning signals from the threshold sensor 22 and determine if the measured indicia is indicative of an emergency event. The detection system 20 can include an integrated alarm 28 that can be activated if the SOC 26 determines an emergency event is occurring at or proximate to the space. The integrated alarm 28 can include a light as depicted in FIGS. 2-4, an auditory siren or speaker, or combinations thereof.

In an example, each persistent sensor 24 can continually, or periodically, monitor the space for information that could aid rescue workers. The space information can include information pertaining to persons within the space including, but are not limited to whether the space is occupied, whether the space has been vacated, the number of occupants, whether the occupants are moving, whether the occupants are injured, or combinations thereof. The persistent sensors 24 can monitor the space for information at regular intervals and determine if there are changes in the space. For example, the persistent sensors 24 can determine if a person within the space has not moved during the interval between measurements of the persistent sensors 24. The space information can also include information pertaining to indicia of the emergency event, which can be used to determine the potential threats to any occupants of the space. In an example, the detection system 20 can include a plurality of persistent sensors 24 each configured to measure for different space information such that the detection system 20 can monitor the space for different space information. The SOC 26 can receive space information from each persistent sensor 24 and communicate the space information to rescue workers. The persistent sensors 24 can gather space information before and after the threshold sensors 22 have generated a warning signal indicating that at least one indicia of an emergency event have exceed a predetermined threshold.

In an example, the detection system 20 can include an integrated transmitter/receiver 30 for communicating the warning signals and/or space information to a remote receiver. The remote receiver can include, but is not limited to a central control system for a building in which the detection system 20 is installed, a repeater system for long distance communication, a system for onsite rescue workers, a handheld or portable device carried rescue workers, a dispatcher for rescue workers, or combinations thereof. The integrated transmitter/receiver 30 can receive instructions from the remote receiver or central control system for operation of the persistent sensors 24. The integrated transmitter/receiver 30 can allow the remote receiver or central control system to initiate scanning of the space with the persistent sensors 24. The detection system 20 can include a speaker 31 allowing communication through the remote receiver or the central control system with persons within the space to provide direction to the persons by the rescue workers.

Figure 2:
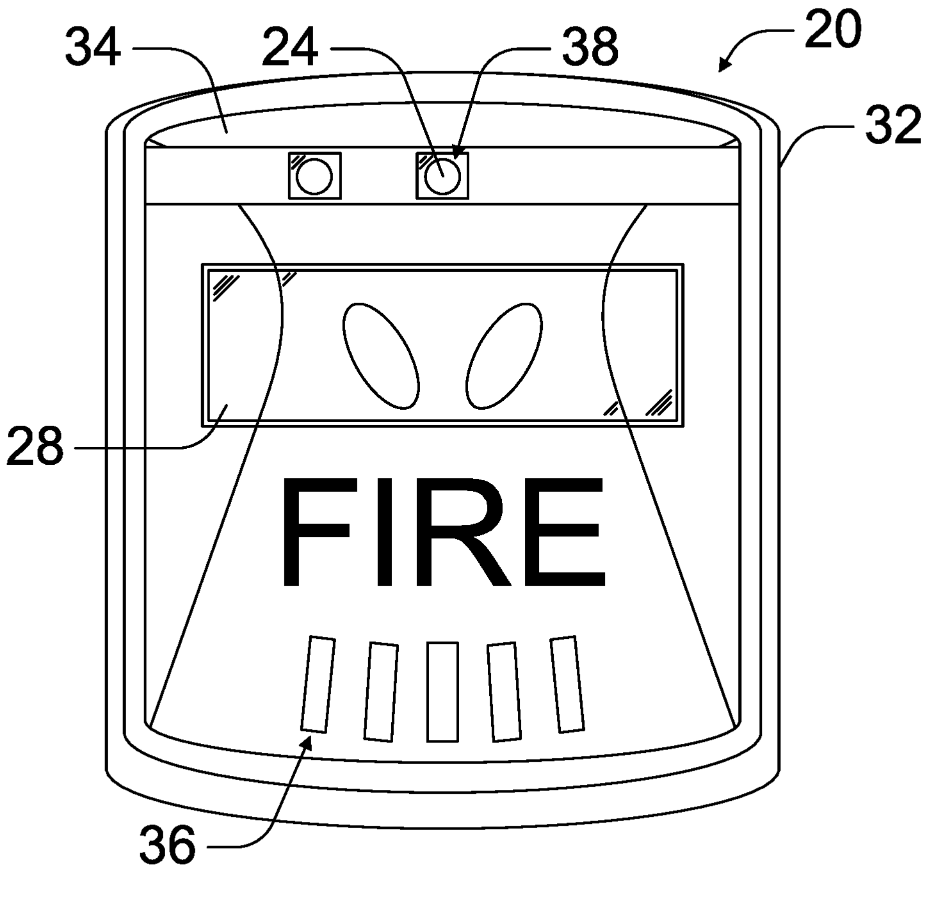
FIG. 2 is a front view of a detection system according to an example of the present disclosure.
Figure 3:
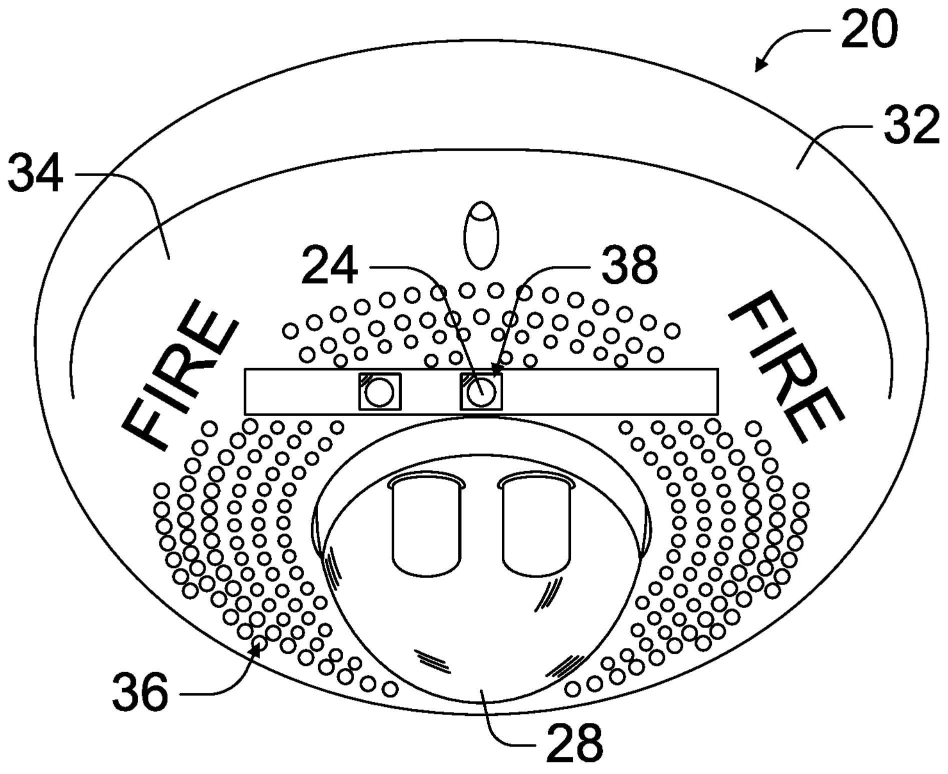
FIG. 3 is a perspective view of a detection system according to an example of the present disclosure.
Figure 4:
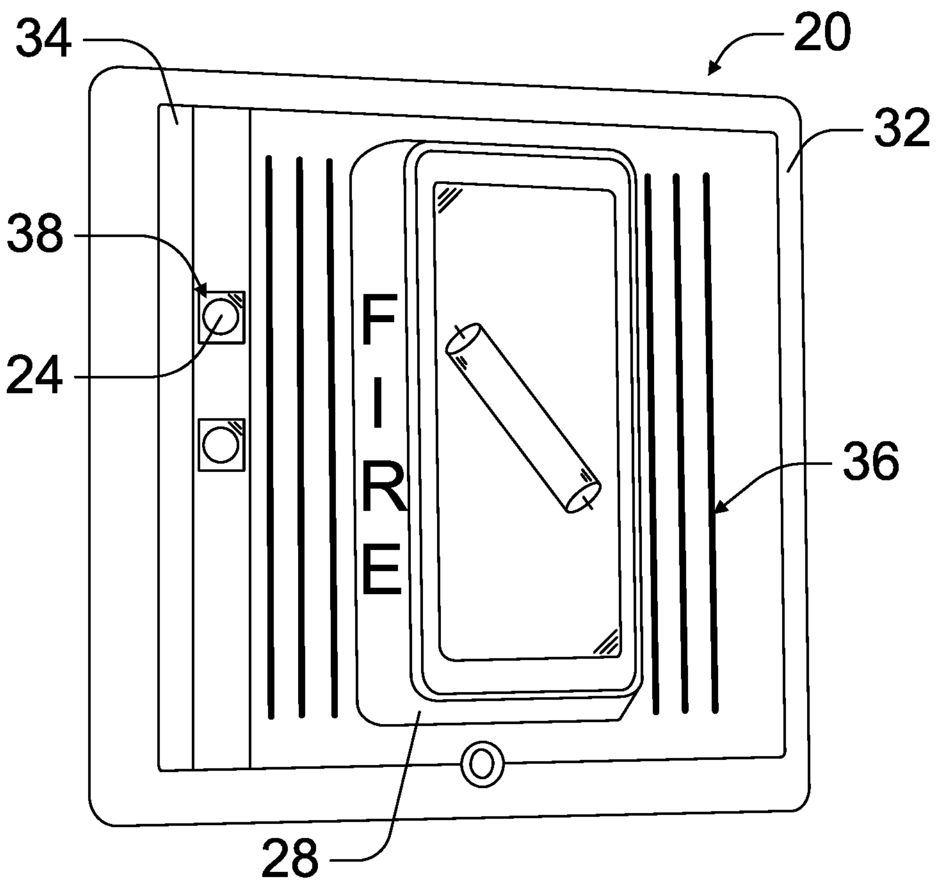
FIG. 4 is a perspective view of a detection system according to an example of the present disclosure.

As depicted in FIGS. 2-4, in an example, the detection system 20 can include a housing 32 and a cover 34 for enclosing the SOC 26, the threshold sensor 22, and the persistent sensor 24. At least one of the housing 32 and the cover 34 can define at least one opening 36 through which the at least one threshold sensor 22 can monitor the space. Similarly, at least one of the housing 32 and the cover 34 can include at least one port 38 through which the alt east one persistent sensor 24 can monitor the space.

Figure 5:
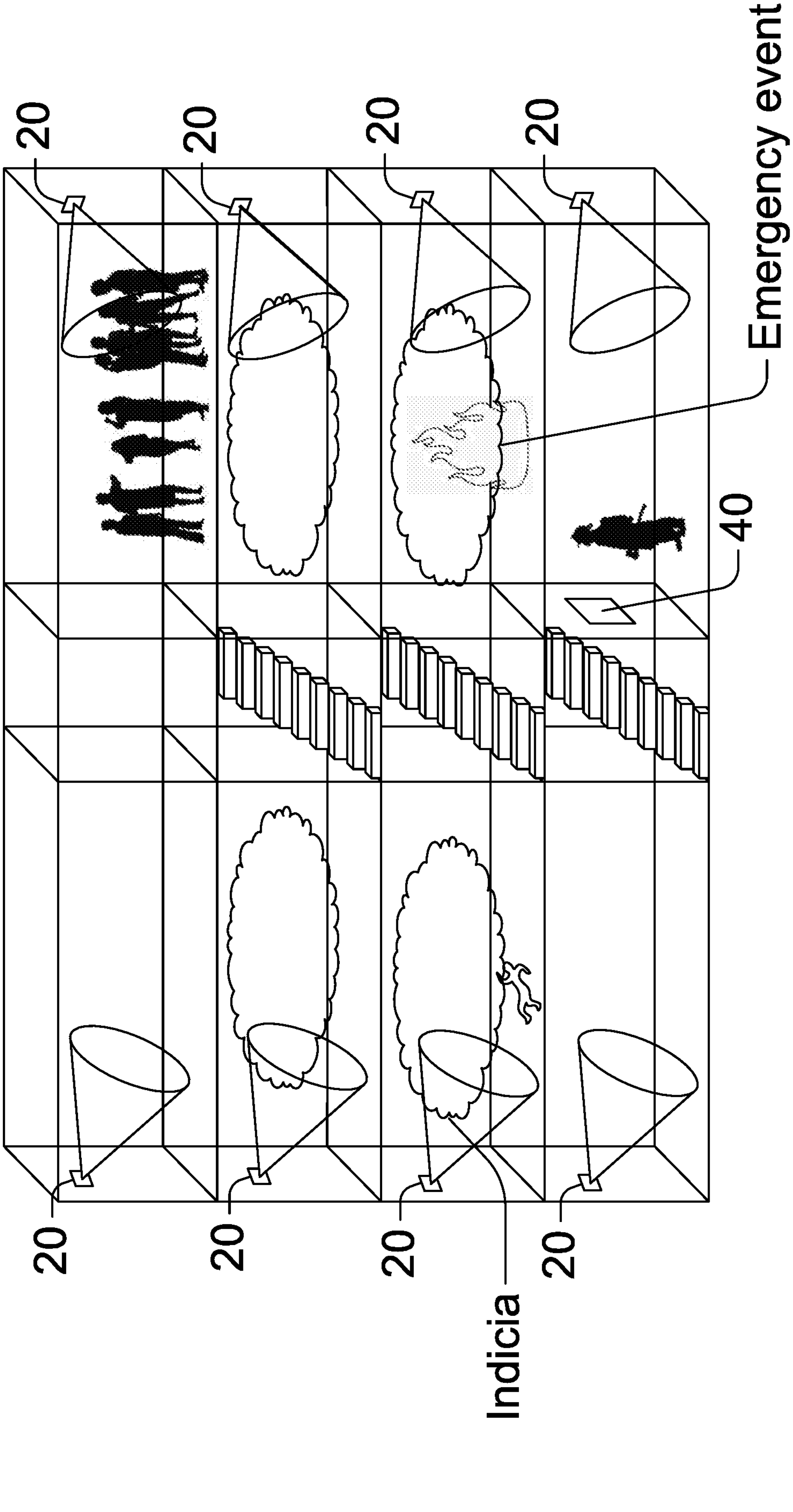
FIG. 5 is a schematic diagram of a building having a plurality of detection systems according to an example of the present disclosure.
Figure 6:
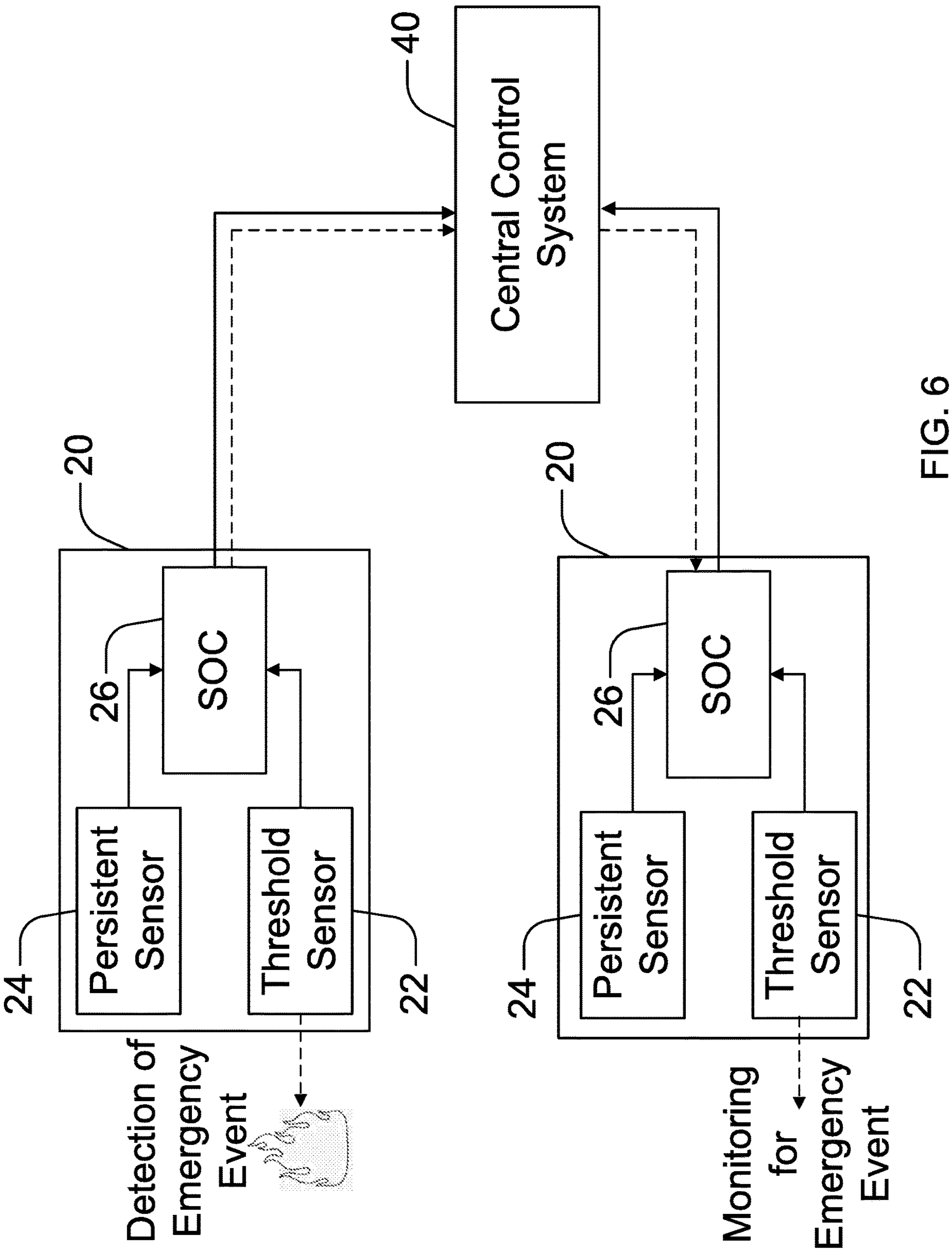
FIG. 6 is a schematic diagram of a building system having a plurality of detection systems according to an example of the present disclosure.

As depicted in FIGS. 5-6, a plurality of detection systems 20 according to an example of the present disclosure can be mounted in a plurality of spaces within a building. In this configuration, each detection system 20 can be operably connected to a control panel 40 for the building by a wired or wireless connection. The threshold sensor 22 of each detection system 20 monitors its respective space for indicia of an emergency event. Upon detection of an indicia exceeding a predetermined threshold and determination by the SOC 26 that an emergency event is occurring, the respective detection system 20 will notify the control panel 40 that an emergency event is occurring within the space or proximate to the space. Each detection system 20 that determines an emergency event is occurring within or proximate the corresponding space monitored by the detection system 20 will signal the control panel 40. The control panel 40 can provide a display indicating to rescue personnel viewing the control panel 40 which detection systems 20 have determined an emergency event is occurring within its vicinity. The control panel 40 can also accumulate the notifications from the detection systems 20 detecting emergency events to approximate the location of the emergency event within the building.

The persistent sensor 26 of each detection system 20 that has determined that an emergency event is occurring in its vicinity will continue to monitor the indicia within the space and notify the control panel 40 if the emergency event increases in severity. The persistent sensor 26 of these detection systems 20 can also determine if persons are present within the corresponding space and if they are moving and not deceased. If the persistent sensor 26 detects the presence of persons, the detection system 20 can notify the control panel 40 that persons are in the vicinity of the emergency event and whether the person is moving. The persistent sensor 26 can continue to monitor the persons within the space and notify the control panel 40 if the persons leave the space or cease moving.

In an example, upon determination of an emergency event by one or more of the plurality of detection systems 20 and notification of the control panel 40, the control panel 40 can notify the remaining detection systems 20 that an emergency event is occurring within the building. The threshold sensors 24 of the notified detection systems 20 will continue to monitor their respective spaces and notify the control panel 40 if indicia of an emergency event are detected within their respective space. In this configuration, the notified detection systems 20 can be used to track the spread of the emergency event through the building. Similarly, the persistent sensors 26 of the notified detection systems 20 can determine if persons are within the building, but outside the immediate vicinity of the emergency event. The space information from the notified detection systems 20 can be transmitted to the control panel 40 allowing rescue workers to identify persons still within the building who are not in any immediate danger or who could be trapped by the emergency event.

As discussed above, the control panel 40 is an example of a remote receiver for the plurality of detection systems 20, whereby the control panel 40 can receive warning signals and space information from the plurality of detection systems 20 and provide the accumulated information to rescue workers. The control panel 40 can accumulate the information from the detection systems 20 and communicate the accumulated information to rescue workers, dispatchers and other relevant parties by wireless or wired communication. The control panel 40 can include a short range transmitter for communicating the accumulated information to onsite rescue workers. The control panel 40 can be wired to hard line connections or include a long range transmitter for communicating the accumulated information to offsite rescue workers or dispatchers. In an example, each detection system 20 can be configured to communicate the accumulated information directly to displays or devices carried by onsite rescue workers or vehicles. In another example, each detection system 20 can be configured to communicate the accumulated information directly to a communication system for relaying the accumulated information to onsite and offsite rescue workers.

In an example, a method for detecting an emergency event and communicating space information to rescue workers can include a detection step, a monitoring step, and a transmitting step.

In the detection step, a threshold sensor 22 of a detector system 20 can monitor a space for indicia of an emergency event exceeding a predetermined threshold. If the threshold sensor 22 detects that the indicia exceeds a predetermined threshold, the threshold sensor 22 can transmit a warning signal to the SOC 28.

In the monitoring step, a persistent sensor 24 of the detector system 20 can continually gather space information on the space. The persistent sensor 24 can continually monitor the space prior to and after the threshold sensor 22 determines that a measured indicia exceeds a predetermined threshold. In an example, the SOC 28 can receive commands from a remote receiver or a central control panel 40 to operate the persistent sensor 24.

In the transmitting step, the SOC 28 can notify rescue workers of the detected emergency event via an integrated transmitter/receiver 30. The SOC 28 can also communicate the space information to a remote receiver or a central control panel 40 accessible by rescue workers.

VARIOUS NOTES & EXAMPLES

Example 1 is a detection system positioned within a space, comprising: a threshold sensor configured to monitor the space for an indicia of an emergency event; a system on a chip ("SOC") configured to receive a warning signal from the threshold sensor if the measured indicia exceeds a predetermined level; and a persistent sensor configured to monitor the space to gather space information following signaling of the SOC by the threshold sensor that the measured indicia exceeds a predetermined level.

In Example 2, the subject matter of Example 1 optionally includes wherein the indicia includes temperature, humidity, smoke, open flames, harmful gases, insufficient ventilation, radiation, explosions, gun shots, and combinations thereof.

In Example 3, the subject matter of Example 2 optionally includes wherein the threshold sensor comprises at least one of an optical camera, a 3D camera, an infrared sensor, a temperature sensor, a humidity sensor, a barometric sensor, an air quality sensor, a particulate sensor, a motion sensor, a microphone, or combinations thereof.

In Example 4, the subject matter of any one or more of Examples 1-3 optionally include wherein the space information includes occupancy of the space, number of occupants, vacating of the space, movement of occupants within the space, injuries or limitations of occupants of the space, or combinations thereof.

In Example 5, the subject matter of Example 4 optionally includes wherein the space information includes at least one indicia of the emergency event for monitoring of changes in the emergency event.

In Example 6, the subject matter of any one or more of Examples 4-5 optionally include wherein the persistent sensor comprises at least one of an optical camera, a 3D camera, an infrared sensor, a temperature sensor, a humidity sensor, a barometric sensor, an air quality sensor, a particulate sensor, a motion sensor, a microphone, or combinations thereof.

In Example 7, the subject matter of any one or more of Examples 1-6 optionally include wherein the persistent sensor is configured to monitor the space to gather space information prior to signaling of the SOC by the threshold sensor that the measured indicia exceeds a predetermined level.

In Example 8, the subject matter of Example 7 optionally includes wherein the SOC compares the space information gathered prior to the measured indicia and the space information gathered following the measured indicia to determine if changes have occurred within the space.

In Example 9, the subject matter of any one or more of Examples 1-8 optionally include wherein the persistent sensor is operable by the SOC to make discrete measurements at regular intervals.

In Example 10, the subject matter of Example 9 optionally includes an integrated receiver for receiving instructions for the SOC to operate the persistent sensor to make at least one additional measurement outside the discrete measurements made at regular intervals.

In Example 11, the subject matter of Example 10 optionally includes a speaker operably coupled to the SOC and configured to play auditory messages into the space; wherein the integrated receiver is configured to receive auditory messages for playing by the speaker.

In Example 12, the subject matter of any one or more of Examples 10-11 optionally include a remote handheld device for wirelessly transmitting instructions to the integrated receiver for operating the persistent sensor to collect space information.

In Example 13, the subject matter of any one or more of Examples 1-12 optionally include an integrated transmitter operably coupled to the SOC for transmitting a notification from the SOC upon receiving the warning signal from the threshold sensor.

In Example 14, the subject matter of Example 13 optionally includes wherein the integrated transmitter transmits the notification to a central control panel of a building containing the space.

In Example 15, the subject matter of Example 14 optionally includes wherein the central control panel notifies a second detection system positioned in a second space within the building that the emergency event has occurred in the space.

In Example 16, the subject matter of Example 15 optionally includes wherein a second persistent sensor of notified second detection system monitors the second space for the indicia of the emergency event.

In Example 17, the subject matter of Example 16 optionally includes wherein the second detection system notifies the central control panel upon detection of the indicia of the emergency event in the second space exceeding the predetermined threshold.

In Example 18, the subject matter of any one or more of Examples 15-17 optionally include wherein the second persistent sensor of notified second detection system monitors the second space for space information.

In Example 19, the subject matter of any one or more of Examples 13-18 optionally include wherein the integrated transmitter transmits the notification to a remote handheld device.

In Example 20, the subject matter of Example 19 optionally includes wherein the integrated transmitter transmits the space information gathered by the persistent sensor to the remote handheld device for remote monitoring of the space.

In Example 21, the subject matter of any one or more of Examples 1-20 optionally include a housing defining an internal space for receiving the threshold sensor, the SOC, and the persistent sensor; and a cover engagable to the housing to enclose the internal space.

In Example 22, the subject matter of Example 21 optionally includes wherein at least one of the housing and the cover defines an opening proximate to the threshold sensor through which the threshold sensor can monitor the space for the indicia of the emergency event.

In Example 23, the subject matter of Example 22 optionally includes wherein at least one of the housing and the cover defines a port proximate to the persistent sensor through which the persistent sensor can monitor the space for space information.

In Example 24, the subject matter of any one or more of Examples 1-23 optionally include an integrated alarm operable by the SOC upon receiving of the warning signal from the threshold sensor.

In Example 25, the subject matter of Example 24 optionally includes wherein the integrated arm includes at least one of a light and an auditory siren.

Example 26 is a method of monitoring a space, comprising: monitoring the space by a threshold sensor for an indicia indicating an emergency event; providing a warning signal to a system on a chip ("SOC") from the threshold sensor if the measured indicia exceeds a predetermined level; and gathering space information with a persistent sensor following signaling of the SOC by the threshold sensor that the measured indicia exceeds a predetermined level.

In Example 27, the subject matter of Example 26 optionally includes wherein the indicia includes temperature, humidity, smoke, open flames, harmful gases, insufficient ventilation, radiation, explosions, gun shots, and combinations thereof.

In Example 28, the subject matter of Example 27 optionally includes wherein the threshold sensor comprises at least one of an optical camera, a 3D camera, an infrared sensor, a temperature sensor, a humidity sensor, a barometric sensor, an air quality sensor, a particulate sensor, a motion sensor, a microphone, or combinations thereof.

In Example 29, the subject matter of any one or more of Examples 26-28 optionally include wherein the space information includes occupancy of the space, number of occupants, vacating of the space, movement of occupants within the space, injuries or limitations of occupants of the space, or combinations thereof.

In Example 30, the subject matter of Example 29 optionally includes wherein the space information includes at least one indicia of the emergency event for monitoring of changes in the emergency event.

In Example 31, the subject matter of any one or more of Examples 29-30 optionally include wherein the persistent sensor comprises at least one of an optical camera, a 3D camera, an infrared sensor, a temperature sensor, a humidity sensor, a barometric sensor, an air quality sensor, a particulate sensor, a motion sensor, a microphone, or combinations thereof.

In Example 32, the subject matter of any one or more of Examples 26-31 optionally include gathering space information with a persistent sensor prior to signaling of the SOC by the threshold sensor that the measured indicia exceeds a predetermined level.

In Example 33, the subject matter of Example 32 optionally includes comparing the space information gathered prior to the measured indicia and the space information gathered following the measured indicia to determine if changes have occurred within the space.

In Example 34, the subject matter of any one or more of Examples 26-33 optionally include operating the persistent sensor to make discrete measurements at regular intervals.

In Example 35, the subject matter of Example 34 optionally includes receiving instructions for the SOC with an integrated receiver; and operating the persistent sensor according to the received instructions to make at least one additional measurement outside the discrete measurements made at regular intervals.

In Example 36, the subject matter of Example 35 optionally includes receiving auditory messages with the integrated receiver; and playing auditory messages into the space with the speaker.

In Example 37, the subject matter of any one or more of Examples 35-36 optionally include transmitting instructions for operating the persistent sensor to collect space information to the integrated receiver with a remote handheld device.

In Example 38, the subject matter of any one or more of Examples 26-37 optionally include transmitting a notification with an integrated transmitter upon receiving the warning signal from the threshold sensor.

In Example 39, the subject matter of Example 38 optionally includes transmitting the notification with the integrated transmitter to a central control panel of a building containing the space.

In Example 40, the subject matter of Example 39 optionally includes notifying a second detection system positioned in a second space within the building that the emergency event has occurred within the space.

In Example 41, the subject matter of Example 40 optionally includes monitoring the second space with a second persistent sensor of the notified second detection system for indicia of the emergency event.

In Example 42, the subject matter of Example 41 optionally includes notifying the central control panel upon detection of the indicia of the emergency event in the second space exceeding the predetermined threshold.

In Example 43, the subject matter of any one or more of Examples 40-42 optionally include gathering space information from the second space with the second persistent sensor of the second detection system.

In Example 44, the subject matter of any one or more of Examples 39-43 optionally include transmitting the notification to a remote handheld device with the integrated transmitter.

In Example 45, the subject matter of any one or more of Examples 39-44 optionally include transmitting the space information gathered by the persistent sensor with the integrated transmitter to the remote handheld device for remote monitoring of the space.

In Example 46, the subject matter of any one or more of Examples 26-45 optionally include providing a housing defining an internal space for receiving the threshold sensor, the SOC, and the persistent sensor; and engaging a cover to the housing to enclose the internal space.

In Example 47, the subject matter of Example 46 optionally includes wherein at least one of the housing and the cover defines an opening proximate to the threshold sensor through which the threshold sensor can monitor the space for the indicia of the emergency event.

In Example 48, the subject matter of Example 47 optionally includes wherein at least one of the housing and the cover defines a port proximate to the persistent sensor through which the persistent sensor can monitor the space for space information.

In Example 49, the subject matter of any one or more of Examples 26-48 optionally include operating an integrated alarm upon receiving of the warning signal from the threshold sensor.

In Example 50, the subject matter of Example 49 optionally includes wherein the integrated arm includes at least one of a light and an auditory siren.

Example 51 is an apparatus comprising means for performing any of the methods of Examples 26-50.

Example 52 is at least one machine-readable medium including instructions, which when executed by a machine, cause the machine to perform operations of any of the methods of Examples 26-50.

Example 53 is an apparatus for monitoring a space, comprising: means for monitoring the space for with a threshold sensor for an indicia for an emergency event; means for providing a warning signal to a system on a chip ("SOC") from the threshold sensor if the measured indicia exceeds a predetermined level; and means for gathering space information with a persistent sensor following signaling of the SOC by the threshold sensor that the measured indicia exceeds a predetermined level.

In Example 54, the subject matter of Example 53 optionally includes wherein the indicia includes temperature, humidity, smoke, open flames, harmful gases, insufficient ventilation, radiation, explosions, gun shots, and combinations thereof.

In Example 55, the subject matter of Example 54 optionally includes wherein the threshold sensor comprises at least one of an optical camera, a 3D camera, an infrared sensor, a temperature sensor, a humidity sensor, a barometric sensor, an air quality sensor, a particulate sensor, a motion sensor, a microphone, or combinations thereof.

In Example 56, the subject matter of any one or more of Examples 53-55 optionally include wherein the space information includes occupancy of the space, number of occupants, vacating of the space, movement of occupants within the space, injuries or limitations of occupants of the space, or combinations thereof.

In Example 57, the subject matter of Example 56 optionally includes wherein the space information includes at least one indicia of the emergency event for monitoring of changes in the emergency event.

In Example 58, the subject matter of any one or more of Examples 56-57 optionally include wherein the persistent sensor comprises at least one of an optical camera, a 3D camera, an infrared sensor, a temperature sensor, a humidity sensor, a barometric sensor, an air quality sensor, a particulate sensor, a motion sensor, a microphone, or combinations thereof.

In Example 59, the subject matter of any one or more of Examples 53-58 optionally include means for gathering space information with a persistent sensor prior to signaling of the SOC by the threshold sensor that the measured indicia exceeds a predetermined level.

In Example 60, the subject matter of Example 59 optionally includes means for comparing the space information gathered prior to the measured indicia and the space information gathered following the measured indicia to determine if changes have occurred within the space.

In Example 61, the subject matter of any one or more of Examples 53-60 optionally include means for operating the persistent sensor to make discrete measurements at regular intervals.

In Example 62, the subject matter of Example 61 optionally includes means for receiving instructions for the SOC; and means for operating the persistent sensor according to the received instructions to make at least one additional measurement outside the discrete measurements made at regular intervals.

In Example 63, the subject matter of Example 62 optionally includes means for receiving auditory messages; and means for playing auditory messages into the space.

In Example 64, the subject matter of any one or more of Examples 62-63 optionally include means for transmitting instructions for operating the persistent sensor to collect space information to the integrated receiver with a remote handheld device.

In Example 65, the subject matter of any one or more of Examples 53-64 optionally include means for transmitting a notification upon receiving the warning signal from the threshold sensor.

In Example 66, the subject matter of Example 65 optionally includes means for transmitting the notification to a central control panel of a building containing the space.

In Example 67, the subject matter of Example 66 optionally includes means for notifying a second apparatus positioned in a second space within the building that the emergency event has occurred within the space.

In Example 68, the subject matter of Example 67 optionally includes means for monitoring the second space with the notified second apparatus for indicia of the emergency event.

In Example 69, the subject matter of Example 68 optionally includes means for notifying the central control panel upon detection of the indicia of the emergency event in the second space exceeding the predetermined threshold.

In Example 70, the subject matter of any one or more of Examples 67-69 optionally include means for gathering space information from the second space with the notified second apparatus.

In Example 71, the subject matter of any one or more of Examples 66-70 optionally include means for transmitting the notification to a remote handheld device.

In Example 72, the subject matter of any one or more of Examples 66-71 optionally include means for transmitting the space information gathered by the persistent sensor to the remote handheld device for remote monitoring of the space.

In Example 73, the subject matter of any one or more of Examples 53-72 optionally include means for providing a housing defining an internal space for receiving the threshold sensor, the SOC, and the persistent sensor; and means for engaging a cover to the housing to enclose the internal space.

In Example 74, the subject matter of Example 73 optionally includes wherein at least one of the housing and the cover defines an opening proximate to the threshold sensor through which the threshold sensor can monitor the space for the indicia of the emergency event.

In Example 75, the subject matter of Example 74 optionally includes wherein at least one of the housing and the cover defines a port proximate to the persistent sensor through which the persistent sensor can monitor the space for space information.

In Example 76, the subject matter of any one or more of Examples 53-75 optionally include means for operating an integrated alarm upon receiving of the warning signal from the threshold sensor.

In Example 77, the subject matter of Example 76 optionally includes wherein the integrated arm includes at least one of a light and an auditory siren.

Example 78 is a detection system positioned within a space, comprising: a threshold sensor; a system on a chip ("SOC"); a persistent sensor; and a controller configured to read computer readable instructions and configured to control operation of the sensor system, wherein the instructions for controlling operation of the sensor system comprises instructions, which when executed by the controller, cause the controller to: monitor the space for with the threshold sensor for an indicia for an emergency event; provide a warning signal to the from the threshold sensor if the measured indicia exceeds a predetermined level; and gather space information with the persistent sensor following signaling of the SOC by the threshold sensor that the measured indicia exceeds a predetermined level.

In Example 79, the subject matter of Example 78 optionally includes wherein the indicia includes temperature, humidity, smoke, open flames, harmful gases, insufficient ventilation, radiation, explosions, gun shots, and combinations thereof.

In Example 80, the subject matter of Example 79 optionally includes wherein the threshold sensor comprises at least one of an optical camera, a 3D camera, an infrared sensor, a temperature sensor, a humidity sensor, a barometric sensor, an air quality sensor, a particulate sensor, a motion sensor, a microphone, or combinations thereof.

In Example 81, the subject matter of any one or more of Examples 78-80 optionally include wherein the space information includes occupancy of the space, number of occupants, vacating of the space, movement of occupants within the space, injuries or limitations of occupants of the space, or combinations thereof.

In Example 82, the subject matter of Example 81 optionally includes wherein the space information includes at least one indicia of the emergency event for monitoring of changes in the emergency event.

In Example 83, the subject matter of any one or more of Examples 81-82 optionally include wherein the persistent sensor comprises at least one of an optical camera, a 3D camera, an infrared sensor, a temperature sensor, a humidity sensor, a barometric sensor, an air quality sensor, a particulate sensor, a motion sensor, a microphone, or combinations thereof.

In Example 84, the subject matter of any one or more of Examples 78-83 optionally include wherein the instructions to controll operation of the sensor system comprises instructions to: gather space information with a persistent sensor prior to signaling of the SOC by the threshold sensor that the measured indicia exceeds a predetermined level.

In Example 85, the subject matter of Example 84 optionally includes wherein the instructions to control operation of the sensor system comprise instructions to: compare the space information gathered prior to the measured indicia and the space information gathered following the measured indicia to determine if changes have occurred within the space.

In Example 86, the subject matter of any one or more of Examples 78-85 optionally include wherein the instructions to control operation of the sensor system comprise instructions to: operate the persistent sensor to make discrete measurements at regular intervals.

In Example 87, the subject matter of Example 86 optionally includes wherein the instructions for controlling operation of the sensor system comprises instructions for: receive instructions for the SOC with an integrated receiver; and operate the persistent sensor according to the received instructions to make at least one additional measurement outside the discrete measurements made at regular intervals.

In Example 88, the subject matter of Example 87 optionally includes wherein the instructions for controlling operation of the sensor system comprises instructions for: receive auditory messages with the integrated receiver; and playe auditory messages into the space with the speaker.

In Example 89, the subject matter of any one or more of Examples 87-88 optionally include wherein the instructions for controlling operation of the sensor system comprises instructions for: transmit instructions for operating the persistent sensor to collect space information to the integrated receiver with a remote handheld device.

In Example 90, the subject matter of any one or more of Examples 78-89 optionally include wherein the instructions for controlling operation of the sensor system comprises instructions for: transmit a notification with an integrated transmitter upon receiving the warning signal from the threshold sensor.

In Example 91, the subject matter of Example 90 optionally includes wherein the instructions for controlling operation of the sensor system comprises instructions for: transmit the notification with the integrated transmitter to a central control panel of a building containing the space.

In Example 92, the subject matter of Example 91 optionally includes wherein the instructions for controlling operation of the sensor system comprises instructions for: notify a second detection system positioned in a second space within the building that the emergency event has occurred within the space.

In Example 93, the subject matter of Example 92 optionally includes wherein the instructions for controlling operation of the sensor system comprises instructions for: monitor the second space with a second persistent sensor of the notified second detection system for indicia of the emergency event.

In Example 94, the subject matter of Example 93 optionally includes wherein the instructions for controlling operation of the sensor system comprises instructions for: notify the central control panel upon detection of the indicia of the emergency event in the second space exceeding the predetermined threshold.

In Example 95, the subject matter of any one or more of Examples 92-94 optionally include wherein the instructions for controlling operation of the sensor system comprises instructions for: gather space information from the second space with the second persistent sensor of the second detection system.

In Example 96, the subject matter of any one or more of Examples 90-95 optionally include wherein the instructions for controlling operation of the sensor system comprises instructions for: transmit the notification to a remote handheld device with the integrated transmitter.

In Example 97, the subject matter of Example 96 optionally includes wherein the instructions for controlling operation of the sensor system comprises instructions for: transmit the space information gathered by the persistent sensor with the integrated transmitter to the remote handheld device for remote monitoring of the space.

In Example 98, the subject matter of any one or more of Examples 78-97 optionally include a housing defining an internal space for receiving the threshold sensor, the SOC, and the persistent sensor; and a cover engagable to the housing to enclose the internal space.

In Example 99, the subject matter of Example 98 optionally includes wherein at least one of the housing and the cover defines an opening proximate to the threshold sensor through which the threshold sensor can monitor the space for the indicia of the emergency event.

In Example 100, the subject matter of Example 99 optionally includes wherein at least one of the housing and the cover defines a port proximate to the persistent sensor through which the persistent sensor can monitor the space for space information.

In Example 101, the subject matter of any one or more of Examples 78-100 optionally include wherein the instructions for controlling operation of the sensor system comprises instructions for: operate an integrated alarm upon receiving of the warning signal from the threshold sensor.

In Example 102, the subject matter of Example 101 optionally includes wherein the integrated arm includes at least one of a light and an auditory siren.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A detection system positioned within a space, comprising:

a threshold sensor configured to monitor the space for at least one indicia of an emergency event that exceeds a predetermined threshold;

a system on a chip ("SOC") configured to receive a warning signal from the threshold sensor in response to the threshold sensor detecting the at least one indicia that exceeds the predetermined threshold; and a persistent sensor configured to monitor the space to gather space information in response to the SOC receiving the warning signal, wherein the space information includes a number of occupants in a space, wherein the persistent sensor monitors the space at regular intervals to gather the space information by making discrete measurements at the regular intervals, and by making at least one additional discrete measurement outside the discrete measurements made at the regular intervals, wherein the space information is based on the discrete measurements and the at least one additional discrete measurement.

2. The detection system of claim 1, wherein the at least one indicia includes temperature, humidity, smoke, open flames, harmful gases, insufficient ventilation, radiation, explosions, gun shots, or combinations thereof.

3. The detection system of claim 2, wherein the threshold sensor comprises at least one of an optical camera, a 3D camera, an infrared sensor, a temperature sensor, a humidity sensor, a barometric sensor, an air quality sensor, a particulate sensor, a motion sensor, a microphone, or combinations thereof.

4. The detection system of claim 1, wherein the space information further includes occupancy of the space, vacating of the space, movement of occupants within the space, injuries or limitations of occupants of the space, or combinations thereof.

5. The detection system of claim 4, wherein the space information includes the at least one indicia of the emergency event for monitoring of changes in the emergency event.

6. The detection system of claim 4, wherein the persistent sensor comprises at least one of an optical camera, a 3D camera, an infrared sensor, a temperature sensor, a humidity sensor, a barometric sensor, an air quality sensor, a particulate sensor, a motion sensor, a microphone, or combinations thereof.

7. The detection system of claim 1, wherein the persistent sensor is operable by the SOC to make the discrete measurements at the regular intervals.

8. The detection system of claim 7, further comprising:

an integrated receiver for receiving instructions for the SOC to operate the persistent sensor to make the at least one additional discrete measurement outside the discrete measurements made at the regular intervals.

9. The detection system of claim 8, further comprising:

a speaker operably coupled to the SOC and configured to play auditory messages into the space;

wherein the integrated receiver is configured to receive auditory messages for playing by the speaker.

10. The detection system of claim 1, further comprising:

an integrated transmitter operably coupled to the SOC for transmitting a notification from the SOC upon receiving the warning signal from the threshold sensor.

11. The detection system of claim 1, further comprising:

a housing defining an internal space for receiving the threshold sensor, the SOC, and the persistent sensor; and a cover engageable to the housing to enclose the internal space.

12. The detection system of claim 11, wherein at least one of the housing and the coves defines:

an opening proximate to the threshold sensor through which the threshold sensor can monitor the space for the at least one indicia of the emergency event; and a port proximate to the persistent sensor through which the persistent sensor can monitor the space for space information.

13. A method of monitoring a space, comprising:

monitoring the space by a threshold sensor for at least one indicia of an emergency event that exceeds a predetermined threshold;

providing a warning signal by the threshold sensor to a system on a chip ("SOC") in response to the threshold sensor detecting the at least one indicia that exceeds the predetermined threshold; and gathering space information associated with the space by a persistent sensor in response to the SOC receiving the warning signal, wherein the space information includes a number of occupants in a space, wherein the persistent sensor gathers the space information by making discrete measurements at the regular intervals, and by making at least one additional discrete measurement outside the discrete measurements made at the regular intervals, wherein the space information is based on the discrete measurements and the at least one additional discrete measurement.

14. The method of claim 13, wherein the at least one indicia includes temperature, humidity, smoke, open flames, harmful gases, insufficient ventilation, radiation, explosions, gun shots, or combinations thereof.

15. The method of claim 13, wherein the space information includes occupancy of the space, vacating of the space, movement of occupants within the space, injuries or limitations of occupants of the space, or combinations thereof.

16. The method of claim 15, wherein the space information includes the at least one indicia of the emergency event for monitoring of changes in the emergency event.

17. The method of claim 13, further comprising:

gathering space information with the persistent sensor to monitor the space for changes in the space or changes in the space information.

18. The method of claim 13, further comprising:

receiving instructions for the SOC with an integrated receiver; and operating the persistent sensor according to the received instructions to make the at least one additional discrete measurement outside the discrete measurements made at the regular intervals.

19. The method of claim 13, further comprising:

receiving auditory messages with an integrated receiver; and playing auditory messages into the space with a speaker.

20. The method of claim 13, further comprising:

transmitting instructions for operating the persistent sensor to collect space information to an integrated receiver with a remote handheld device.

21. The method of claim 13, further comprising:

transmitting a notification with an integrated transmitter upon receiving the warning signal from the threshold sensor.

22. The method of claim 21, further comprising:

transmitting the notification with the integrated transmitter to a central control panel of a building containing the space.

23. The method of claim 22, further comprising:

notifying a second detection system positioned in a second space within the building that the emergency event has occurred within the space;

monitoring the second space with a second persistent sensor of the notified second detection system for the at least one indicia of the emergency event; and notifying the central control panel upon detection of the at least one indicia f the emergency event in the second space exceeding the predetermined threshold.

24. The method of claim 23, further comprising:

gathering space information from the second space with the second persistent sensor of the second detection system.

25. The method of claim 21, further comprising:

transmitting the space information gathered by the persistent sensor with the integrated transmitter to a remote handheld device for remote monitoring of the space.

* * * * *